(12) United States Patent
Liu et al.

(10) Patent No.: US 10,676,066 B2
(45) Date of Patent: Jun. 9, 2020

(54) METHOD FOR AUTHORIZING VIRTUAL KEY AND SERVER

(71) Applicant: GREAT WALL MOTOR COMPANY LIMITED, Hebei (CN)

(72) Inventors: Jing Liu, Hebei (CN); Qi Li, Hebei (CN); Yansong Guo, Hebei (CN); Jixuan Li, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 0 days.

(21) Appl. No.: 16/288,302

(22) Filed: Feb. 28, 2019

(65) Prior Publication Data
US 2019/0232919 A1 Aug. 1, 2019

Related U.S. Application Data

(63) Continuation of application No. PCT/CN2017/086436, filed on May 27, 2017.

(30) Foreign Application Priority Data

Aug. 31, 2016 (CN) .......................... 2016 1 0793590

(51) Int. Cl.
*B60R 25/20* (2013.01)
*B60R 25/24* (2013.01)

(52) U.S. Cl.
CPC .......... *B60R 25/2018* (2013.01); *B60R 25/20* (2013.01); *B60R 25/24* (2013.01)

(58) Field of Classification Search
CPC ......... B60R 25/00; B60R 25/24; B60R 25/04; G07B 15/00; G07C 9/00; G06F 17/00; G05B 19/00

(Continued)

(56) References Cited

U.S. PATENT DOCUMENTS 8,880,239 B2 * 11/2014 Kleve .................... B60R 25/24
                                                            701/2
9,449,449 B2 * 9/2016 Evans .................. H04L 63/102
(Continued)

FOREIGN PATENT DOCUMENTS

| CN | 104424679 A | 3/2015 |
|---|---|---|
| CN | 106394487 A | 2/2017 |
| JP | 2016150651 A | 8/2016 |

OTHER PUBLICATIONS

CN 104424679 A (Mar. 18, 2015) by Li Xuedong; Byd Co. Ltd. Translated by google.com/patents. (Year: 2015).*

(Continued)

*Primary Examiner* — Nam V Nguyen
(74) *Attorney, Agent, or Firm* — Osha Liang LLP (57) ABSTRACT

Embodiments of the present disclosure provide a method for authorizing a virtual key, a server, and a non-transitory computer-readable storage medium. The method, implemented in a server, includes: receiving an authorization command sent from a first mobile terminal; after the identity information of the first mobile terminal passes verification, integrating the plurality of authorization function codes to generate a code set, and sending the code set to a second mobile terminal of a user to be authorized through the first mobile terminal; receiving identity information of the second mobile terminal and the code set sent from the second mobile terminal; and after the identity information of the second mobile terminal passes verification, generating virtual keys of the plurality of functions of the vehicle corresponding to the plurality of authorization function codes, and sending the virtual keys to the second mobile terminal.

12 Claims, 4 Drawing Sheets

(58) Field of Classification Search
USPC ............ 340/5.61, 5.7, 5.71; 455/420–422.1; 701/115; 705/4, 39, 307
See application file for complete search history.

(56) References Cited

U.S. PATENT DOCUMENTS

| | | | |
|---|---|---|---|
| 9,858,737 B2 * | 1/2018 | Davidsson | ............... E05B 49/00 |
| 10,382,412 B2 * | 8/2019 | Fujiwara | ............. B60R 25/2018 |
| 10,384,643 B2 * | 8/2019 | Pudar | .................... B60R 25/209 |
| 2011/0213629 A1 * | 9/2011 | Clark | ..................... G06Q 10/02 |
| | | | 705/5 |
| 2013/0179005 A1 | 7/2013 | Nishimoto et al. | |
| 2013/0259232 A1 | 10/2013 | Petel | |
| 2014/0129301 A1 | 5/2014 | Van Wiemeersch et al. | |
| 2015/0120151 A1 | 4/2015 | Akay et al. | |
| 2019/0009747 A1 * | 1/2019 | Guo | ........................ B60R 25/04 |

OTHER PUBLICATIONS

Office Action issued in corresponding Chinese Application No. 201610793590.7 dated Apr. 28, 2018, and English translation thereof (15 pages).
International Search Report issued in corresponding International Application No. PCT/CN2017/086436 dated Aug. 28, 2017 (2 pages).
Written Opinion issued in corresponding International Application No. PCT/CN2017/086436 dated Aug. 28, 2017 (4 pages).
Office Action with Search Report issued in corresponding European Applicaton No. 17844947.6, dated Mar. 30, 2020 (6 pages).

* cited by examiner

METHOD FOR AUTHORIZING VIRTUAL KEY AND SERVER

CROSS REFERENCE TO RELATED APPLICATIONS

This application is a continuation of International Application No. PCT/CN2017/086436, which claims priority and benefits of Chinese Patent Application No. 201610793590.7, and filed by GREAT WALL MOTOR COMPANY LIMITED on Aug. 31, 2016, the entire content of which is incorporated herein by reference.

FIELD

The present disclosure relates to a technology field of vehicles, and more particularly to a method for authorizing a virtual key, a server, and a non-transitory computer-readable storage medium.

BACKGROUND

At present, after keys of vehicles are virtualized, information code representing the keys can be told to the third party by means of verbal or short message, and the third party can complete functions such as unlocking the door, starting the engine and turning on the trunk through corresponding an APP (Application) in a mobile phone.

In the related art, for example, with a temporary authorization method for a mobile communication device, after an authorizing party and an authorized party confirm authorization information, the authorizing party automatically sends and authorizes the authorization information to a management party, and the management party records and grants the authorized party a temporary right. For example, with a method for authorizing a smart key in a wireless terminal, a server sends an authorization certificate to an authorized mobile terminal, so as to grant the authorized mobile terminal a right to control a vehicle. For example, a vehicle operation authority granting system capable of granting a vehicle operation authority while maintaining safety can grant access to a server to a second portable electronic device by using a key registered in a first portable electronic device, and cause the second portable electronic device to operate as an electronic key having an authority to operate the vehicle. For example, with a method for opening a vehicle gate, when a user opens the vehicle gate using a second terminal, the gate device obtains an identification of the second terminal, and verifies the second terminal according to the identification and a terminal list. When the second terminal passes the verification of the gate device, the gate device controls a gate lock actuator to open the vehicle gate.

SUMMARY

Embodiments of the present disclosure provide a method for authorizing a virtual key, including: receiving an authorization command sent from a first mobile terminal, in which the authorization command includes identity information of the first mobile terminal and a plurality of authorization function codes, and the plurality of authorization function codes have one-to-one corresponding to a plurality of functions of a vehicle; after the identity information of the first mobile terminal passes verification, integrating the plurality of authorization function codes to generate a code set, and sending the code set to a second mobile terminal of a user to be authorized through the first mobile terminal, such that the second mobile terminal confirms the code set; receiving identity information of the second mobile terminal and the code set sent from the second mobile terminal; and after the identity information of the second mobile terminal passes verification, generating virtual keys of the plurality of functions of the vehicle corresponding to the plurality of authorization function codes, and sending the virtual keys to the second mobile terminal, such that the second mobile terminal enables performing corresponding control on the vehicle.

Embodiments of the present disclosure provide a server, including: a first receiving module, configured to receive an authorizing command sent from a first mobile terminal, in which the authorization command includes identity information of the first mobile terminal and a plurality of authorization function codes, and the plurality of authorization function codes have one-to-one corresponding to a plurality of functions of a vehicle; a code set generating module, configured to, after the identity information of the first mobile terminal passes verification, integrate the plurality of authorization function codes to generate a code set, and to send the code set to a second mobile terminal of a user to be authorized through the first mobile terminal, such that the second mobile terminal confirms the code set; a second receiving module, configured to receive identity information of the second mobile terminal and the code set sent from the second mobile terminal; and a virtual keys generating module, configured to, after the identity information of the second mobile terminal passes verification, generate virtual keys of the plurality of functions of the vehicle corresponding to the plurality of authorization function codes, and to send the virtual keys to the second mobile terminal, such that the second mobile terminal enables performing corresponding control on the vehicle.

Embodiments of the present disclosure provide a system for authorizing a virtual key, including the server according to above embodiments.

Embodiments of the present disclosure provide a device. The device includes: one or more processors; memory; and one or more programs stored in the memory, when executed by the one or more processors, performing the method for authorizing a virtual key according to above embodiments.

Embodiments of the present disclosure provide a non-transitory computer-readable storage medium. The non-transitory computer-readable storage medium has one or more programs stored thereon, when executed by a device, causing the device to perform the method for authorizing a virtual key according to above embodiments.

BRIEF DESCRIPTION OF THE DRAWINGS

The drawings that form a part of the present disclosure are intended to provide a further understanding of the present disclosure. The illustrative embodiments of the present disclosure and the description thereof are intended to explain the present disclosure and are not intended to limit the present disclosure. In the drawings.

REFERENCE NUMERALS

Server 10, first receiving module 100, code set generating module 200, second receiving module 300, and virtual keys generating module 400.

DETAILED DESCRIPTION

It should be noted that, the embodiments in the present disclosure and the features in the embodiments may be combined with each other without conflict.

The present disclosure will be described in detail with reference to drawings in combination with embodiments.

Figure 1:
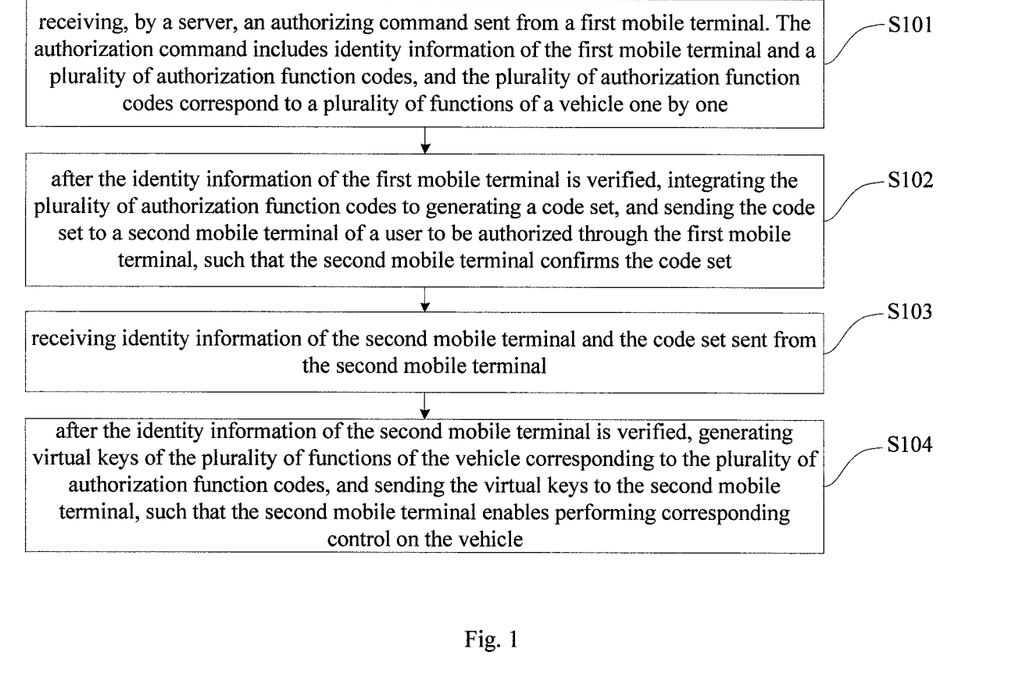
FIG. 1 is a flow chart of a method for authorizing a virtual key according to an embodiment of the present disclosure.

FIG. 1 is a flow chart of a method for authorizing a virtual key according to an embodiment of the present disclosure.

As illustrated in FIG. 1, the method for authorizing a virtual key according to embodiments of the present disclosure includes following actions.

At block S101, a server receives an authorization command sent from a first mobile terminal. The authorization command includes identity information of the first mobile terminal and a plurality of authorization function codes, and the plurality of authorization function codes have one-to-one corresponding to a plurality of functions of a vehicle.

Further, the identity information of the first mobile terminal includes identity information of an owner of the first mobile terminal and identification information of the first mobile terminal, thus the server may determine whether the first mobile terminal has an authorization authority.

At block S102, after the identity information of the first mobile terminal passes verification, the plurality of authorization function codes are integrated to generate a code set, and the code set is sent to a second mobile terminal of a user to be authorized through the first mobile terminal, such that the second mobile terminal confirms the code set.

Figure 2:
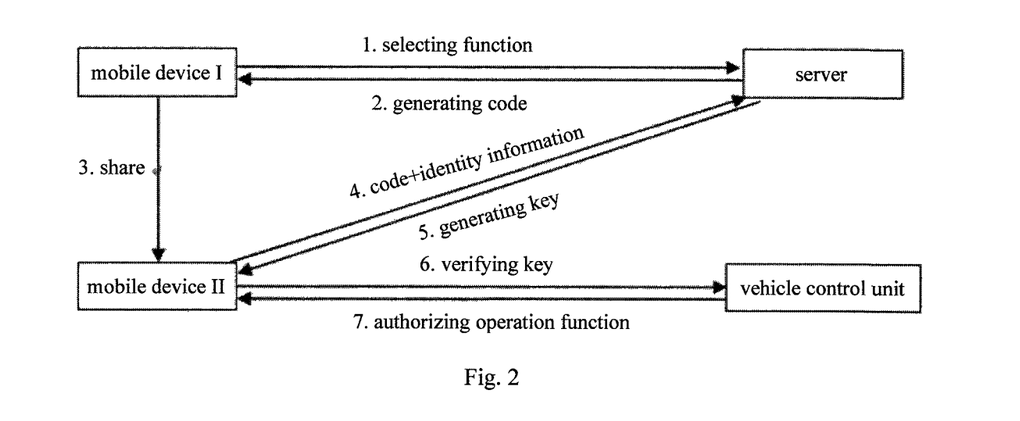
FIG. 2 is a schematic diagram illustrating principle for authorizing a virtual key according to an embodiment of the present disclosure.
Figure 3:
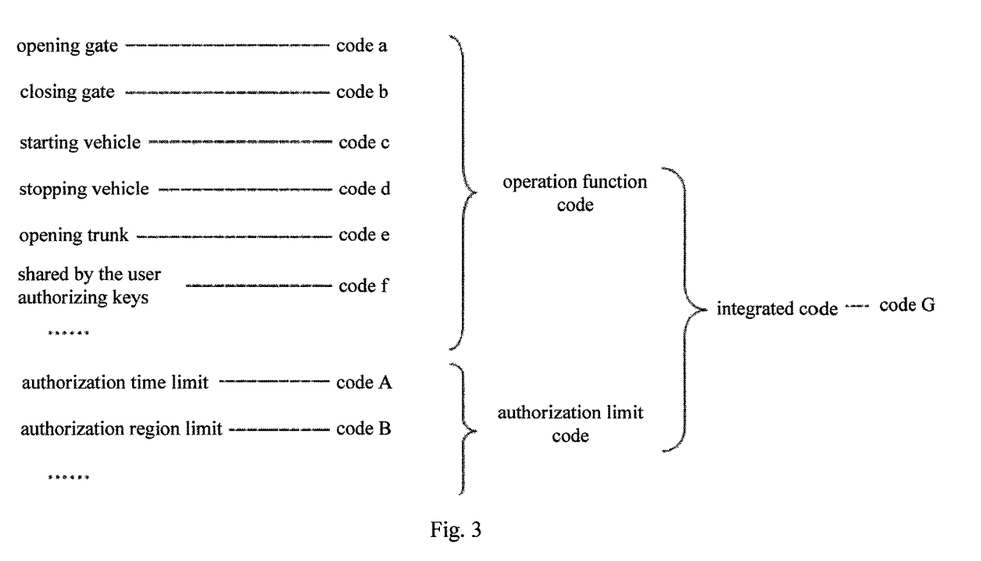
FIG. 3 is a schematic diagram illustrating authorization functions and corresponding codes according to an embodiment of the present disclosure.

It should be understood that, as illustrated in FIG. 2, a mobile device I (an authorizing terminal, equivalent to the first mobile terminal) may select authorization functions, and send all the authorization function codes to the server. The server may generate a corresponding code (i.e., a code set G integrated by code a corresponding to opening a vehicle gate and code b corresponding to closing the vehicle gate) and send the code to the mobile device I. The mobile device I informs the code to a mobile device II (an authorized terminal, equivalent to the second mobile terminal).

At block S103, identity information of the second mobile terminal and the code set sent from the second mobile terminal are received.

At block S104, after the identity information of the second mobile terminal passes verification, virtual keys of the plurality of functions of the vehicle corresponding to the plurality of authorization function codes are generated, and the virtual keys are sent to the second mobile terminal, such that the second mobile terminal enables performing corresponding control on the vehicle.

For example, a courier only needs a trunk opening authority. If all authorities including starting and gates are given to the courier, properties in a vehicle and safety of the vehicle may be affected. Therefore, with the method according to the present disclosure, by authorizing the trunk opening authority to a user who stores items only, safety of properties in the owner's vehicle is effectively ensured. When the vehicle is lent to a friend, a vehicle starting authority is not authorized to a user who uses entertainment facilities in the vehicle only and does not drives the vehicle, thus enabling protecting the user's personal safety.

That is, as illustrated in FIG. 2, after obtaining the code, the mobile device II sends the code and the identify information of the mobile device II to the server. The server generates the keys. When the mobile device II approaches the vehicle, a vehicle control unit verifies the keys, and authorizes vehicle operations that the mobile device II can perform. Storage part of the vehicle control unit pre-stores codes related to detail functions, thus recognition and verification of the codes may be completed independently.

Alternatively, in an embodiment of the present disclosure, the authorization command of the first mobile terminal further includes an authorization time limit and/or an authorization region. That is, the authorization command of the first mobile terminal further includes a usage time and/or times and/or a region of the authorization, thus realizing an objective of authorization controllability, effectively improving the user experience.

Further, in an embodiment of the present disclosure, the method according to the present disclosure further includes: generating a virtual key corresponding to the authorization time limit and/or the authorization region.

It should be understood that, the codes further includes an authorization time limit code A and authorization region code B. Therefore, the virtual key corresponding to the authorization time limit and/or the authorization region is generated. In addition to realizing remote authorization function of the key, it is more practical to limit the usage time and usage place of the key. If the authorized time limit is exceeded or the usage place is not at the authorized region, the authorized key will automatically lose the right to unlock, thus further diversifying the key authorization.

Further, in an embodiment of the present disclosure, the method according to the present disclosure further includes: receiving an instruction of changing the authorization command from the first mobile terminal; and changing a function corresponding to a generated virtual key according to the instruction of changing the authorization command.

That is, in embodiments of the present disclosure, the authorizing terminal may change the authorization command, thereby changing the function corresponding to the virtual key, further improving the controllability of the authorization. For example, the number of times of using the authorization is one, and then considering that the authorization is required to be used multiple times, a changing instruction is sent, so as to increase the number of times of using the authorization to five.

Figure 4:
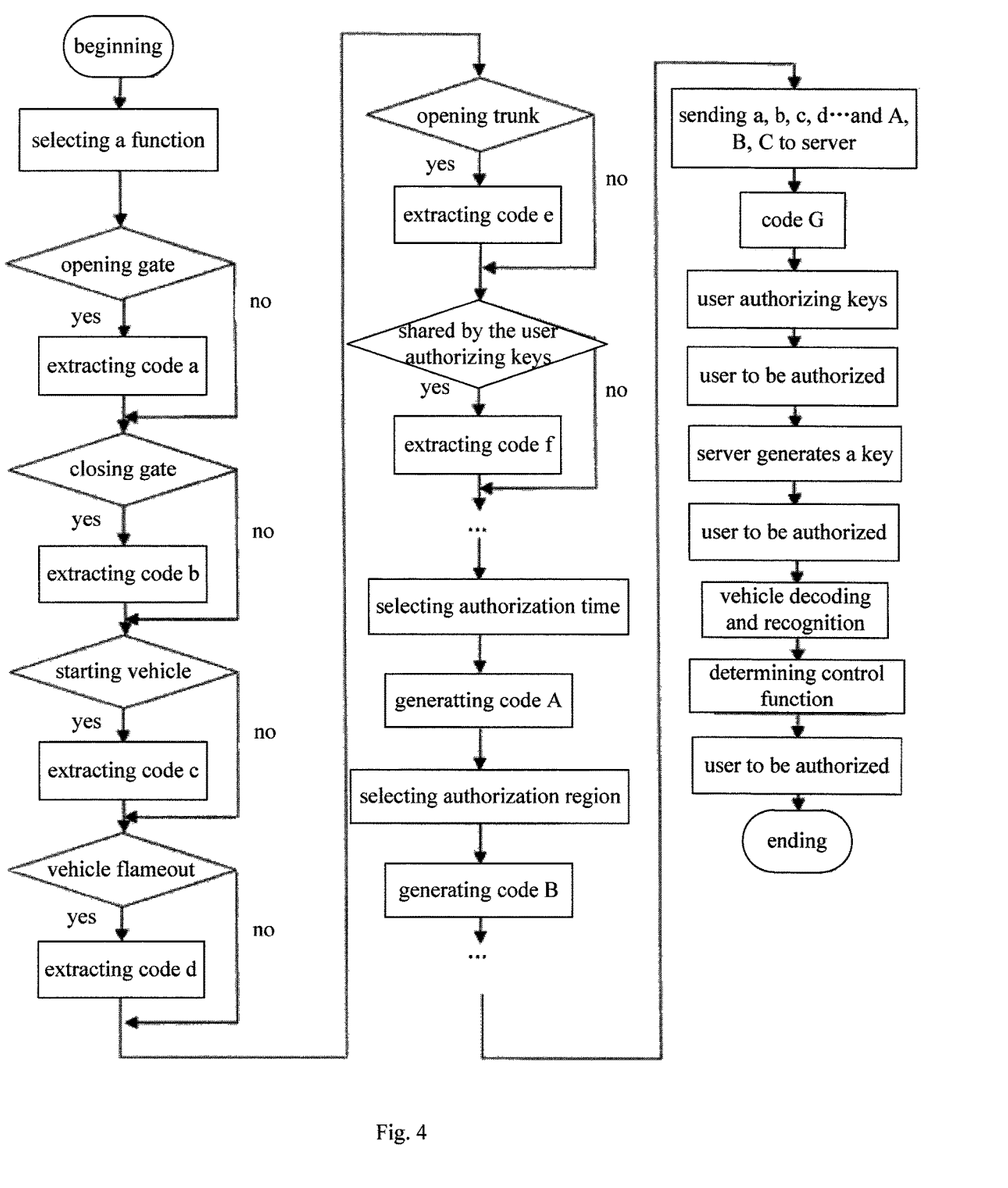
FIG. 4 is a flow chart of a method for authorizing a virtual key according to a specific embodiment of the present disclosure.

For example, as illustrated in FIG. 4, when a user authorizing keys performs key sharing, a function to be shared is determined first. Authorization confirmation of functions such as opening/closing the vehicle gate, opening/stopping the vehicle, and opening the trunk is gradually performed. Each function has its corresponding code. A system extracts corresponding code a, b, c, d, etc. according to the selection of the user authorizing keys. For example, when opening the vehicle gate, if the user authorizing keys selects 'no', the system may not generate code a. If all the selections of the user authorizing keys are 'no', a next operation may not be performed. Then the user authorizing keys confirms the authorization time, the authorization region, and the like. Taking the authorization time as an example, the user authorizing keys may not select a past time or authorization time whose time value is a negative number. After all the selections are processed, the information, i.e., the authorization command is sent to the server. After processing the information, the server generates a total code #, i.e., the code set, and sends back to the user authorizing keys. The user authorizing keys may send the code # to the user to be authorized through various ways, such as a short message, a call, verbal, an email, a chat tool, and the like. The user to be authorized may send the code # and particular identify information to the server. The server generates the key and sends back the key to the user to be authorized. When the user to be authorized approaches the vehicle carrying the virtual key, the vehicle decodes and verifies the key. After the key passes the verification, a vehicle operation function that the key has is determined, and information such as a valid time period and a valid region of the key is determined. Finally, an operation function corresponding to the user to be authorized is activated.

It should be noted that, the order of the above selections is only used for an example. The order of selecting the functions of opening/closing the vehicle gate, starting/stopping the vehicle, opening the trunk, etc. can be exchanged, and the detailed authorization functions are allowed to be performed item by item or two/three/multiple items may be performed simultaneously, which is not specifically limited herein. The user to be authorized is allowed to select a specific authorization function, but the selected authorization function needs to be sent to the user authorizing keys for confirmation.

With the method for authorizing a virtual key according to the present disclosure, after receiving the authorization command, the code set is obtained based on the authorization function codes, and after the identity information of an authorized mobile terminal passes verification, the virtual keys of the plurality of functions of the vehicle corresponding to the plurality of authorization function codes may be generated, thus the authorized mobile terminal may perform corresponding control on the vehicle according to the authorized keys of the plurality of functions of the vehicle, further refining the key sharing and authorization of the vehicle. The keys of different functions are generated by combining different function codes, not only improving controllability and flexibility of keys authorization, simply and conveniently, efficiently ensuring the reliability of the key authorization, realizing a targeted key function authorization, having diversity, but also meeting the usage demand of the user better, meeting different demands of the user for sharing keys in different situations, enhancing personal security of the user, and improving usage experience of the user.

Figure 5:
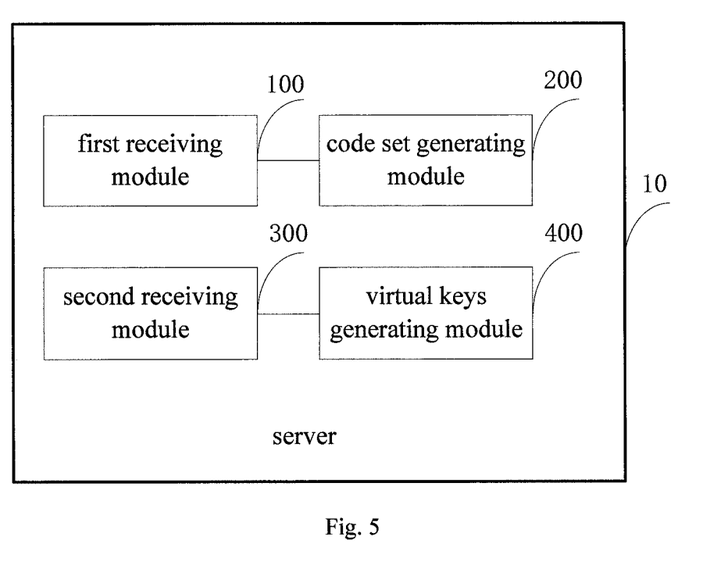
FIG. 5 is a block diagram illustrating a server according to a specific embodiment of the present disclosure.

Further, as illustrated FIG. 5, embodiments of the present disclosure further disclose a server 10, including a first receiving module 100, a code set generating module 200, a second receiving module 300, and a virtual keys generating module 400.

The first receiving module 100 is configured to receive an authorizing command sent from a first mobile terminal. The authorization command includes identity information of the first mobile terminal and a plurality of authorization function codes, and the plurality of authorization function codes have one-to-one corresponding to a plurality of functions of a vehicle. After the identity information of the first mobile terminal passes verification, the code set generating module 200 is configured to integrate the plurality of authorization function codes to generate a code set, and to send the code set to a second mobile terminal of a user to be authorized through the first mobile terminal, such that the second mobile terminal confirms the code set. The second receiving module 300 is configured to receive identity information of the second mobile terminal and the code set sent from the second mobile terminal. After the identity information of the second mobile terminal passes verification, the virtual keys generating module 400 is configured to generate virtual keys of the plurality of functions of the vehicle corresponding to the plurality of authorization function codes, and to send the virtual keys to the second mobile terminal, such that the second mobile terminal enables performing corresponding control on the vehicle. The server 10 according to embodiments of the present disclosure may generate the virtual keys of the plurality of functions of the vehicle corresponding to the plurality of authorization function codes, improving the controllability and flexibility of keys authorization, realizing a targeted key function authorization, and meeting the usage demand of the user better.

Further, in an embodiment of the present disclosure, the identity information of the first mobile terminal includes identity information of an owner of the first mobile terminal and identification information of the first mobile terminal, thus the server may determine whether the first mobile terminal has an authorization authority.

Alternatively, in an embodiment of the present disclosure, the authorization command further includes an authorization time limit and/or an authorization region. That is, the authorization command of the first mobile terminal further includes a usage time and/or times and/or a region of the authorization, thus realizing an objective of authorization controllability, effectively improving the user experience.

Further, the virtual keys generating module is configured to generate a virtual key corresponding to the authorization time limit and/or the authorization region.

That is, the virtual key corresponding to the authorization time limit and/or the authorization region may be generated, thus in addition to realizing remote authorization function of the key, it is more practical to limit the usage time and usage place of the key. If the authorized time limit is exceeded or the usage place is not at the authorized region, the authorized key will automatically lose the right to unlock, thus further diversifying the key authorization.

Further, in an embodiment of the present disclosure, the server according to an embodiment of the present disclosure further includes: a third receiving module, configured to receive a change instruction of the authorization command sent from the first mobile terminal; and a changing module, configured to change a function corresponding to a generated virtual key according to the change instruction of the authorization command.

That is, in embodiments of the present disclosure, the authorizing terminal may change the authorization command, thereby changing the function corresponding to the virtual key, further improving the controllability of the authorization. For example, the number of times of using the authorization is one, and then considering that the authorization is required to be used multiple times, a changing instruction is sent, so as to increase the number of times of using the authorization to five.

It should be noted that, specific implementations of the server according to embodiments of the present disclosure are similar as specific implementations of the method for authorizing a virtual key according to embodiments of the present disclosure, and it is not elaborated herein for purpose of reducing redundancy.

With the server according to embodiments of the present disclosure, after receiving the authorization command, the code set is obtained based on the authorization function codes, and after the identity information of an authorized mobile terminal passes verification, the virtual keys of the plurality of functions of the vehicle corresponding to the plurality of authorization function codes may be generated, thus the authorized mobile terminal may perform corresponding control on the vehicle according to the authorized keys of the plurality of functions of the vehicle, further refining the key sharing and authorization of the vehicle. The keys of different functions are generated by combining different function codes, not only improving controllability and flexibility of keys authorization, simply and conveniently, efficiently ensuring the reliability of the key authorization, realizing a targeted key function authorization, having diversity, but also meeting the usage demand of the user better, meeting different demands of the user for sharing keys in different situations, enhancing personal security of the user, and improving usage experience of the user.

Further, embodiments of the present disclosure further disclose a system for authorizing a virtual key including the server according to above embodiments. Since the system for authorizing a virtual key has above server, after receiving the authorization command, the code set is obtained based on the authorization function codes, and after the identity information of an authorized mobile terminal passes verification, the virtual keys of the plurality of functions of the vehicle corresponding to the plurality of authorization function codes may be generated, thus the authorized mobile terminal may perform corresponding control on the vehicle according to the authorized keys of the plurality of functions of the vehicle, further refining the key sharing and authorization of the vehicle. The keys of different functions are generated by combining different function codes, not only improving controllability and flexibility of keys authorization, simply and conveniently, efficiently ensuring the reliability of the key authorization, realizing a targeted key function authorization, having diversity, but also meeting the usage demand of the user better, meeting different demands of the user for sharing keys in different situations, enhancing personal security of the user, and improving usage experience of the user.

Further, embodiments of the present disclosure further disclose a device, including: one or more processors; memory; and one or more programs stored in the memory, when executed by the one or more processors, performing the method for authorizing a virtual key according to above embodiments. After the device receives the authorization command, the code set is obtained based on the authorization function codes, and after the identity information of an authorized mobile terminal passes verification, the virtual keys of the plurality of functions of the vehicle corresponding to the plurality of authorization function codes may be generated, thus the authorized mobile terminal may perform corresponding control on the vehicle according to the authorized keys of the plurality of functions of the vehicle, further refining the key sharing and authorization of the vehicle. The keys of different functions are generated by combining different function codes, not only improving controllability and flexibility of keys authorization, simply and conveniently, efficiently ensuring the reliability of the key authorization, realizing a targeted key function authorization, having diversity, but also meeting the usage demand of the user better, meeting different demands of the user for sharing keys in different situations, enhancing personal security of the user, and improving usage experience of the user.

Further, embodiments of the present disclosure further disclose a non-transitory computer-readable storage medium, having one or more programs stored thereon, when executed by a device, causing the device to perform the method for authorizing a virtual key according to above embodiments. After the non-transitory computer-readable storage medium receives the authorization command, the code set is obtained based on the authorization function codes, and after the identity information of an authorized mobile terminal passes verification, the virtual keys of the plurality of functions of the vehicle corresponding to the plurality of authorization function codes may be generated, thus the authorized mobile terminal may perform corresponding control on the vehicle according to the authorized keys of the plurality of functions of the vehicle, further refining the key sharing and authorization of the vehicle. The keys of different functions are generated by combining different function codes, not only improving controllability and flexibility of keys authorization, simply and conveniently, efficiently ensuring the reliability of the key authorization, realizing a targeted key function authorization, having diversity, but also meeting the usage demand of the user better, meeting different demands of the user for sharing keys in different situations, enhancing personal security of the user, and improving usage experience of the user.

The above are only the preferred embodiments of the present disclosure, and is not intended to limit the present disclosure. Any modifications, equivalent alternatives, improvements, etc., which are within the spirit and principle of the present disclosure, should be included in the scope of protection of the present disclosure.

What is claimed is:

1. A method for authorizing a virtual key, implemented in a server, comprising:
    receiving an authorization command sent from a first mobile terminal, wherein the authorization command comprises identity information of the first mobile terminal and a plurality of authorization function codes, and the plurality of authorization function codes have one-to-one corresponding to a plurality of functions of a vehicle;
    after the identity information of the first mobile terminal passes verification, integrating the plurality of authorization function codes to generate a code set, and sending the code set to a second mobile terminal of a user to be authorized through the first mobile terminal, such that the second mobile terminal confirms the code set;
    receiving identity information of the second mobile terminal and the code set sent from the second mobile terminal;
    after the identity information of the second mobile terminal passes verification, generating virtual keys of the plurality of functions of the vehicle corresponding to the plurality of authorization function codes, and sending the virtual keys to the second mobile terminal, such that the second mobile terminal enables performing corresponding control on the vehicle;
    receiving an instruction of changing the authorization command from the first mobile terminal; and
    changing a function corresponding to a generated virtual key according to the instruction of changing the authorization command.

2. The method according to claim 1, wherein the identity information of the first mobile terminal comprises identity information of an owner of the first mobile terminal and identification information of the first mobile terminal.

3. The method according to claim 1, wherein the authorization command further comprises an authorization time limit and/or an authorization region.

4. The method according to claim 3, further comprising:
generating a time limit virtual key corresponding to the authorization time limit; and/or
generating a region limit virtual key corresponding to the authorization region.

5. A server, comprising:
one or more processors;
a memory; and
one or more software modules stored in the memory, executable by the one or more processors, and comprising:
a first receiving module, configured to receive an authorizing command sent from a first mobile terminal, wherein the authorization command comprises identity information of the first mobile terminal and a plurality of authorization function codes, and the plurality of authorization function codes have one-to-one corresponding to a plurality of functions of a vehicle;
a code set generating module, configured to, after the identity information of the first mobile terminal passes verification, integrate the plurality of authorization function codes to generate a code set, and to send the code set to a second mobile terminal of a user to be authorized through the first mobile terminal, such that the second mobile terminal confirms the code set;
a second receiving module, configured to receive identity information of the second mobile terminal and the code set sent from the second mobile terminal;
a virtual keys generating module, configured to, after the identity information of the second mobile terminal passes verification, generate virtual keys of the plurality of functions of the vehicle corresponding to the plurality of authorization function codes, and to send the virtual keys to the second mobile terminal, such that the second mobile terminal enables performing corresponding control on the vehicle;
wherein the one or more software modules further comprises:
a third receiving module, configured to receive a change instruction of the authorization command sent from the first mobile terminal; and
a changing module, configured to change a function corresponding to a generated virtual key according to the change instruction of the authorization command.

6. The server according to claim 5, wherein the identity information of the first mobile terminal comprises identity information of an owner of the first mobile terminal and identification information of the first mobile terminal.

7. The server according to claim 5, wherein the authorization command further comprises an authorization time limit and/or an authorization region.

8. The server according to claim 7, wherein the virtual keys generating module is configured to generate:
a time limit virtual key corresponding to the authorization time limit; and/or
a region limit virtual key corresponding to the authorization region.

9. A non-transitory computer-readable storage medium, having one or more programs stored thereon, when executed by a device, causing the device to perform a method for authorizing a virtual key, wherein the method comprises:
receiving an authorization command sent from a first mobile terminal, wherein the authorization command comprises identity information of the first mobile terminal and a plurality of authorization function codes, and the plurality of authorization function codes have one-to-one corresponding to a plurality of functions of a vehicle;
after the identity information of the first mobile terminal passes verification, integrating the plurality of authorization function codes to generate a code set, and sending the code set to a second mobile terminal of a user to be authorized through the first mobile terminal, such that the second mobile terminal confirms the code set;
receiving identity information of the second mobile terminal and the code set sent from the second mobile terminal;
after the identity information of the second mobile terminal passes verification, generating virtual keys of the plurality of functions of the vehicle corresponding to the plurality of authorization function codes, and sending the virtual keys to the second mobile terminal, such that the second mobile terminal enables performing corresponding control on the vehicle;
receiving an instruction of changing the authorization command from the first mobile terminal; and
changing a function corresponding to a generated virtual key according to the instruction of changing the authorization command.

10. The storage medium according to claim 9, wherein the identity information of the first mobile terminal comprises identity information of an owner of the first mobile terminal and identification information of the first mobile terminal.

11. The storage medium according to claim 9, wherein the authorization command further comprises an authorization time limit and/or an authorization region.

12. The storage medium according to claim 11, wherein the method further comprises:
generating a time limit virtual key corresponding to the authorization time limit; and/or
generating a region limit virtual key corresponding to the authorization region.

* * * * *